Jan. 12, 1954
W. B. HILDMANN
2,665,435
END SHEET MACHINE
Original Filed Aug. 17, 1946
11 Sheets-Sheet 2
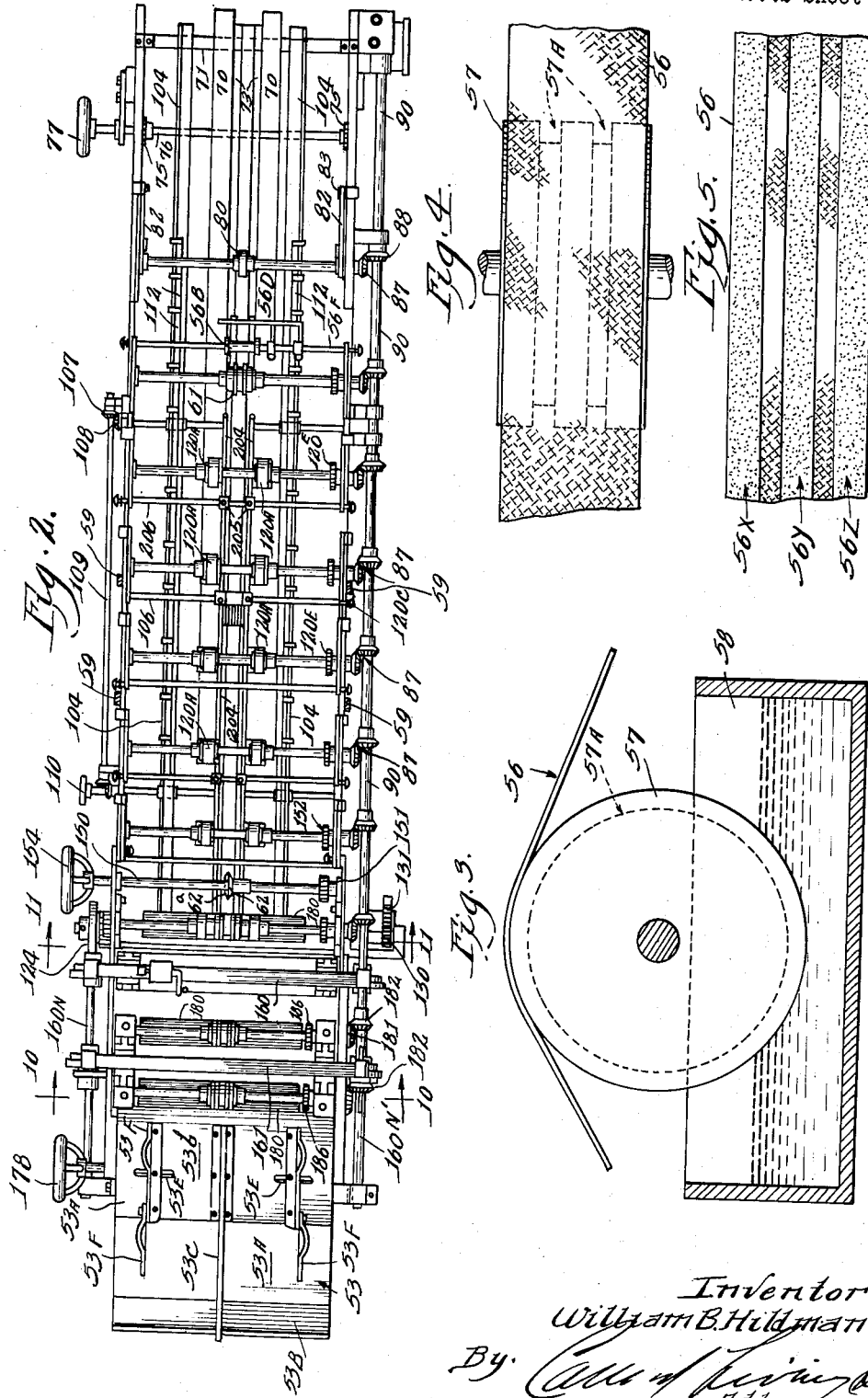
Inventor:-
William B. Hildmann.
By
Attorney.

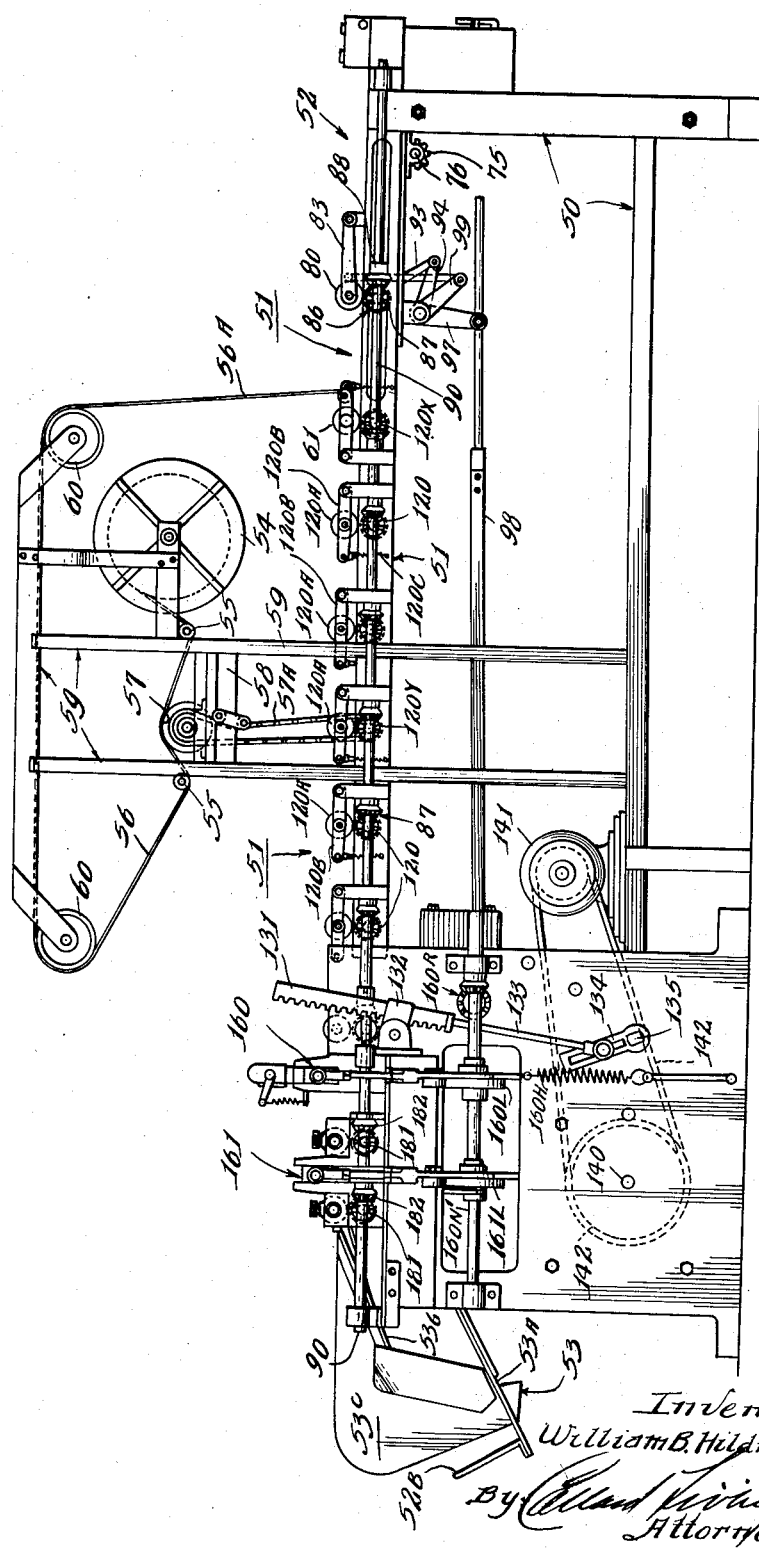

Jan. 12, 1954 W. B. HILDMANN 2,665,435
END SHEET MACHINE
Original Filed Aug. 17, 1946 11 Sheets-Sheet 3

Inventor:-
William B. Hildmann
By Allen Kinzinger
Attorney.

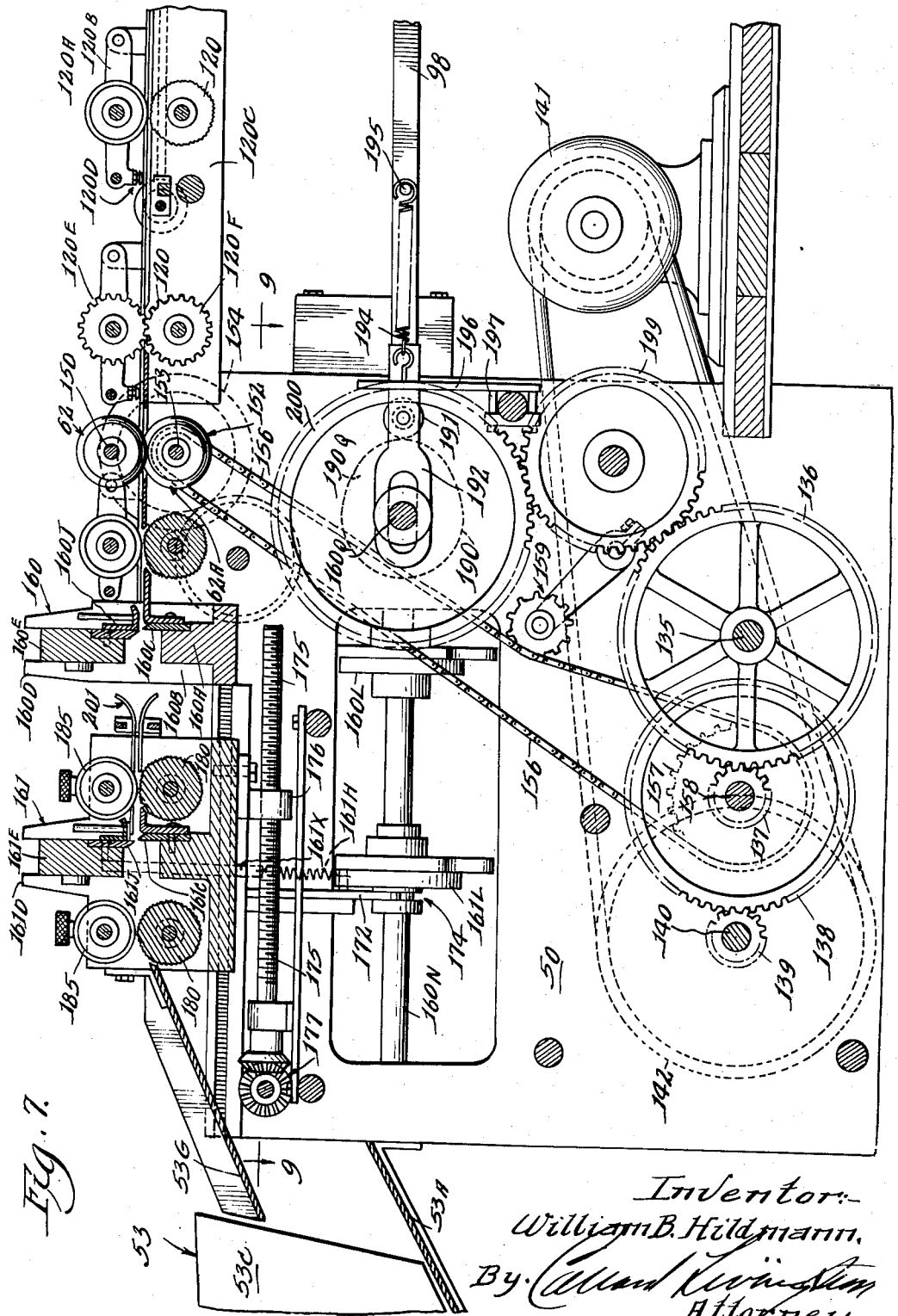

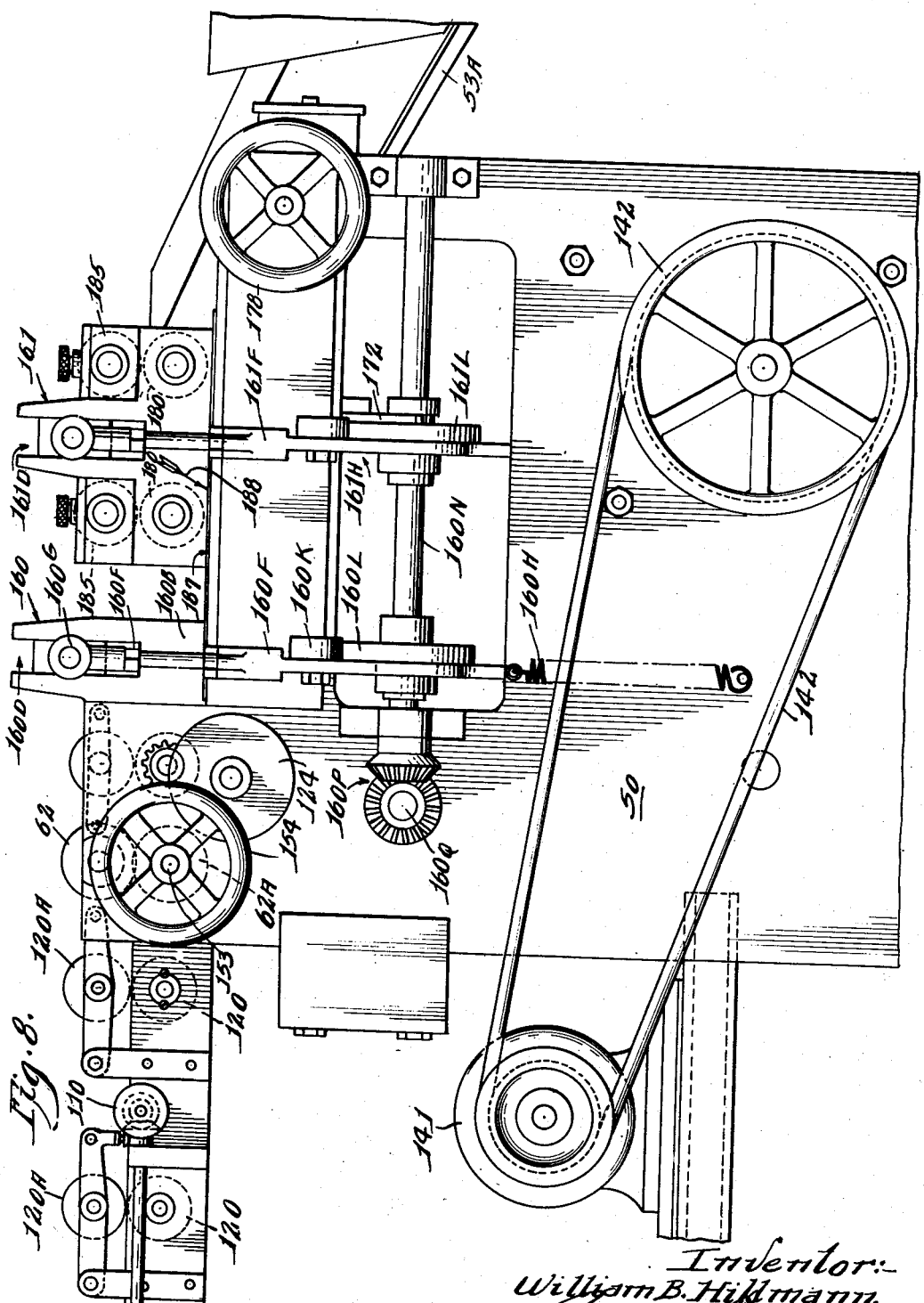

Jan. 12, 1954
W. B. HILDMANN
END SHEET MACHINE
2,665,435
Original Filed Aug. 17, 1946
11 Sheets-Sheet 6
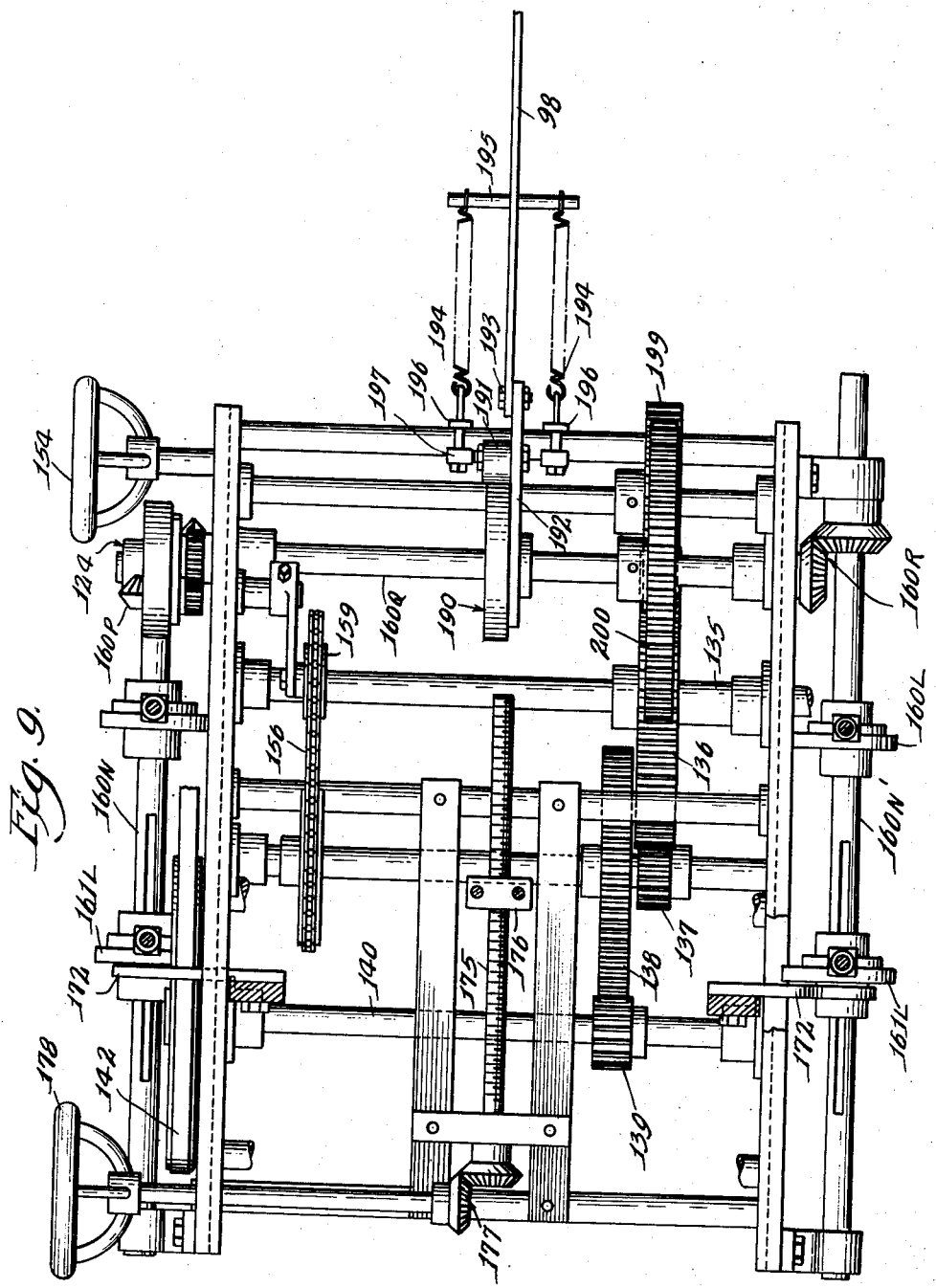
Inventor:-
William B. Hildmann.
By
Attorney.

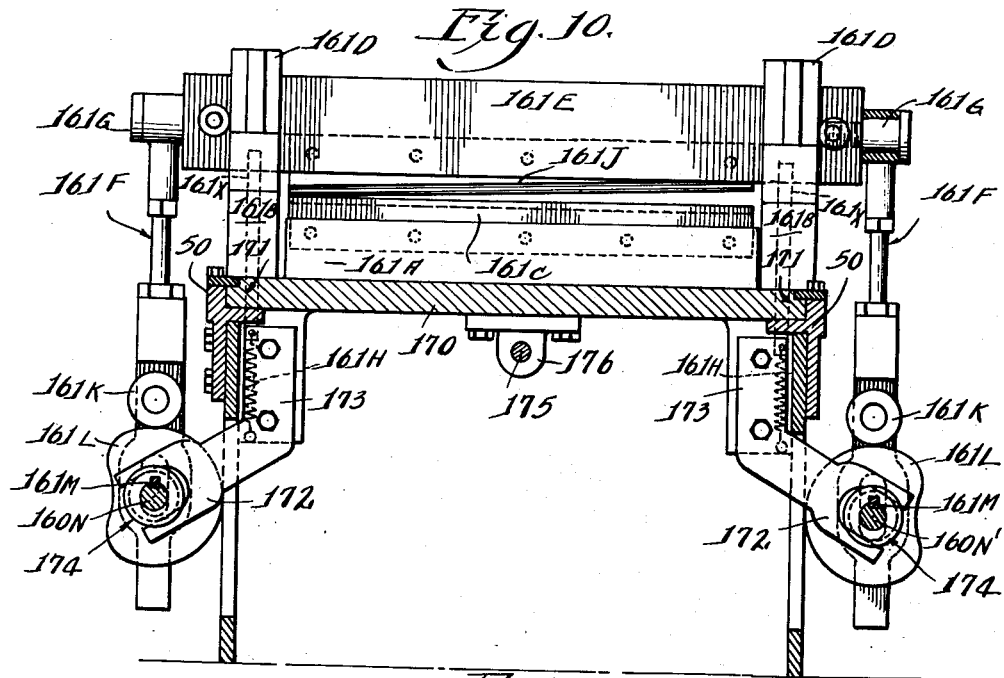

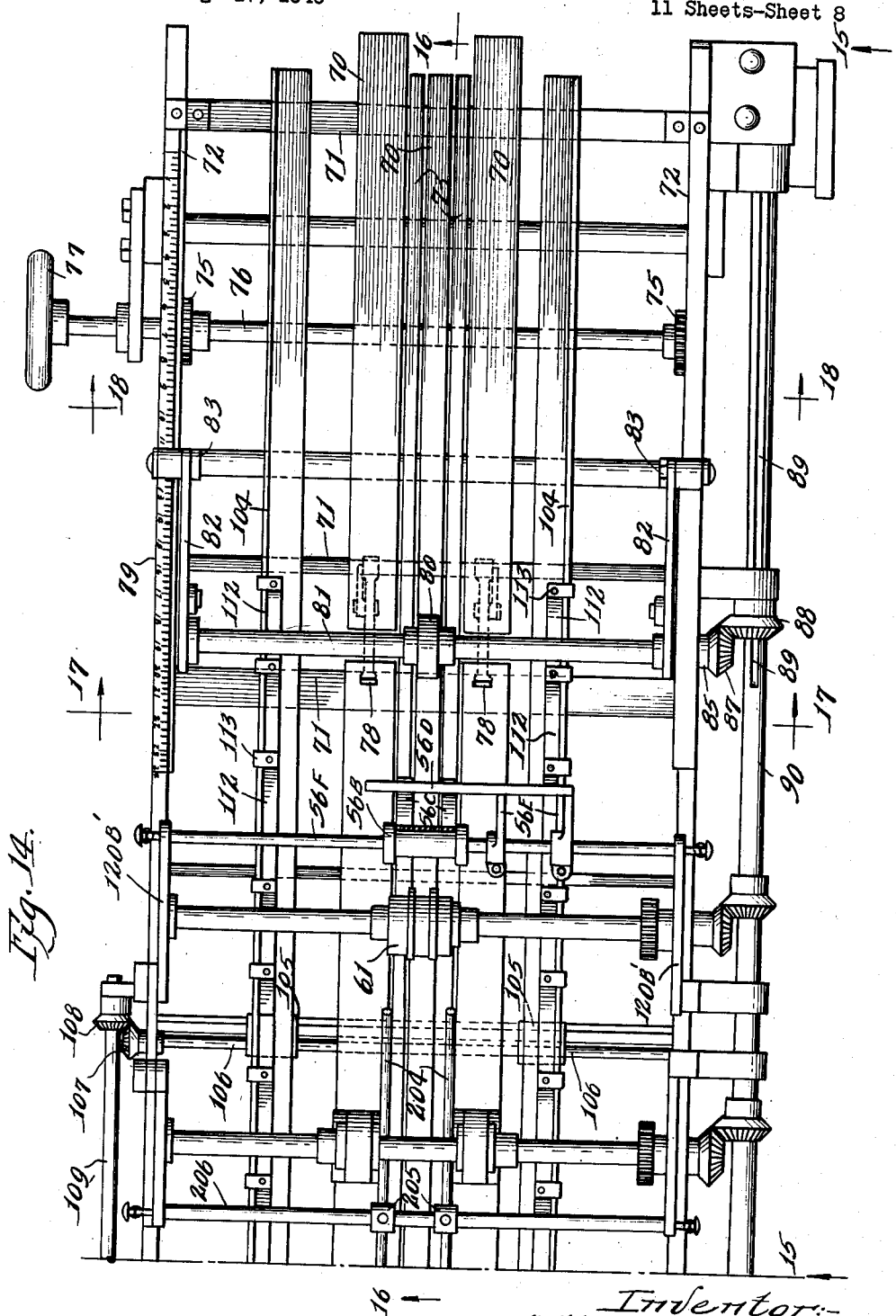

Jan. 12, 1954 W. B. HILDMANN 2,665,435
END SHEET MACHINE
Original Filed Aug. 17, 1946 11 Sheets-Sheet 9
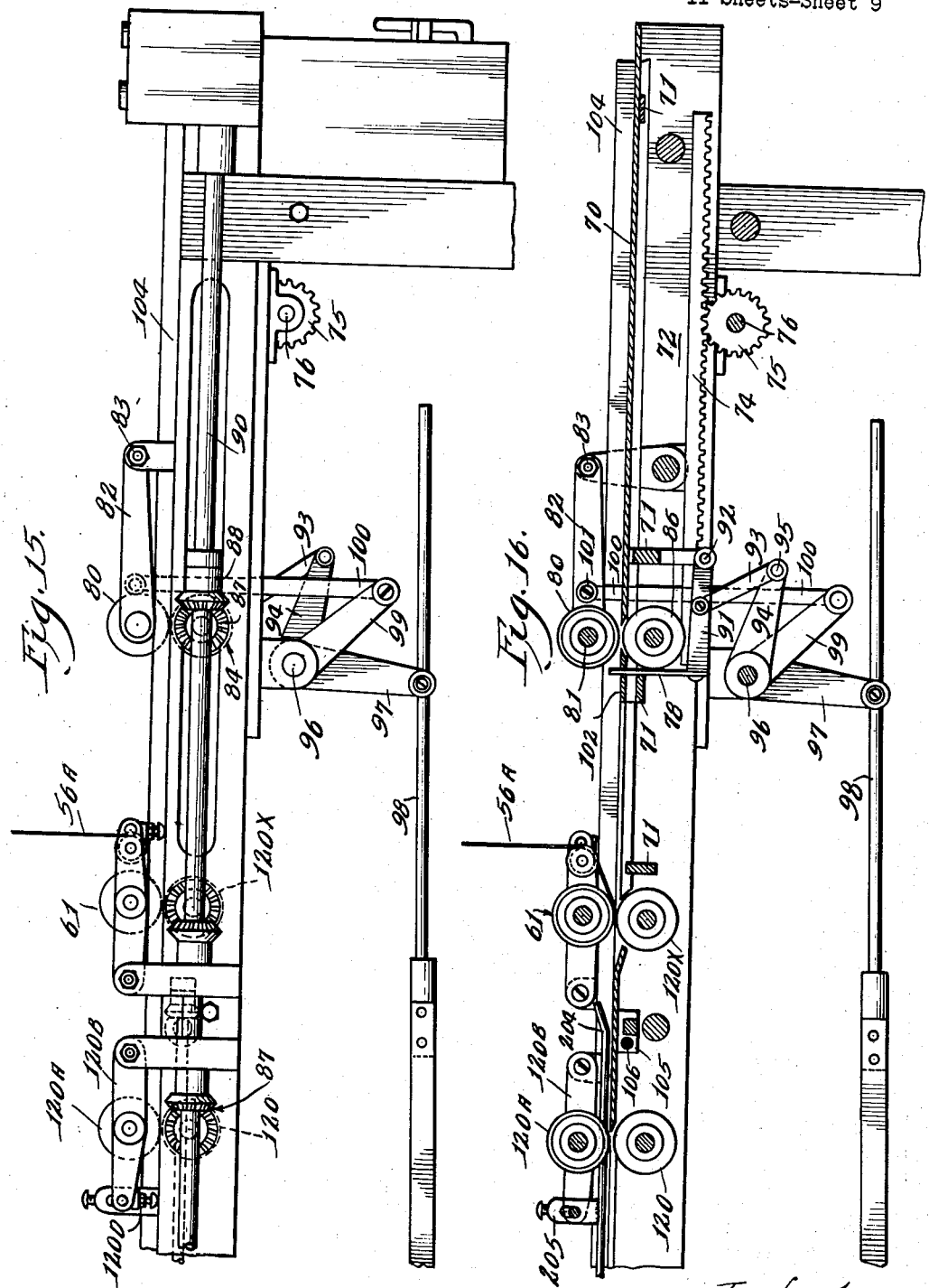
Inventor:
William B. Hildmann
By [signature]
Attorney.

Jan. 12, 1954 W. B. HILDMANN 2,665,435
END SHEET MACHINE
Original Filed Aug. 17, 1946 11 Sheets-Sheet 10
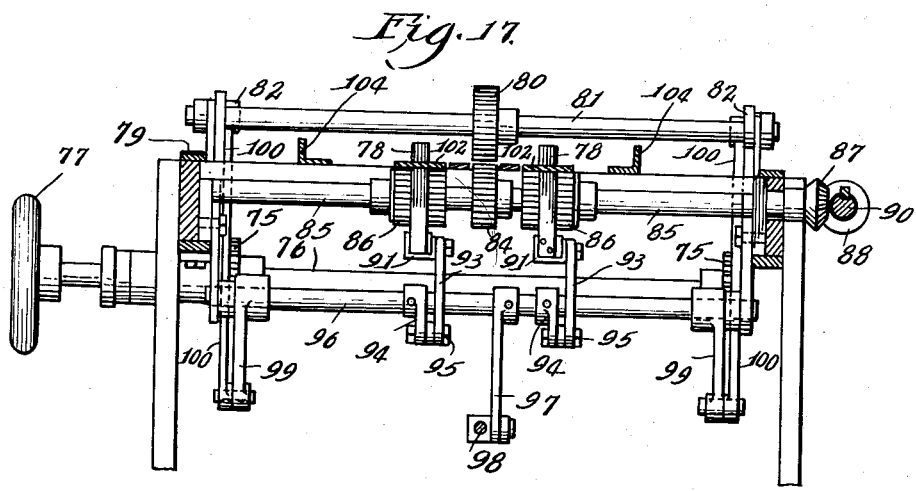
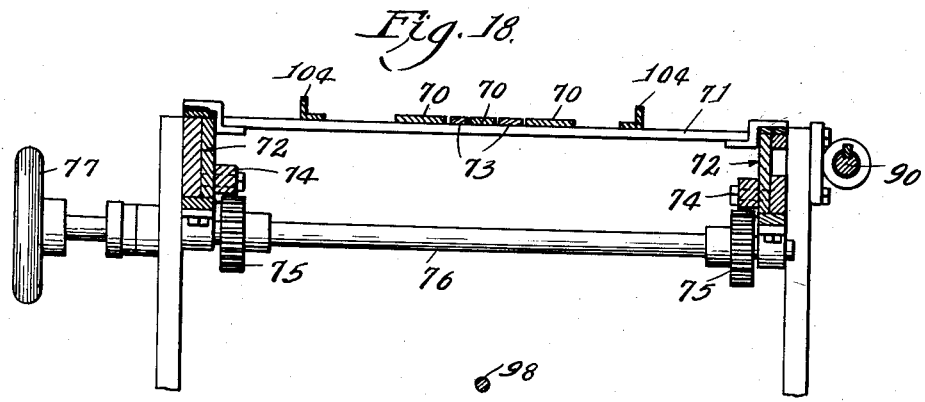
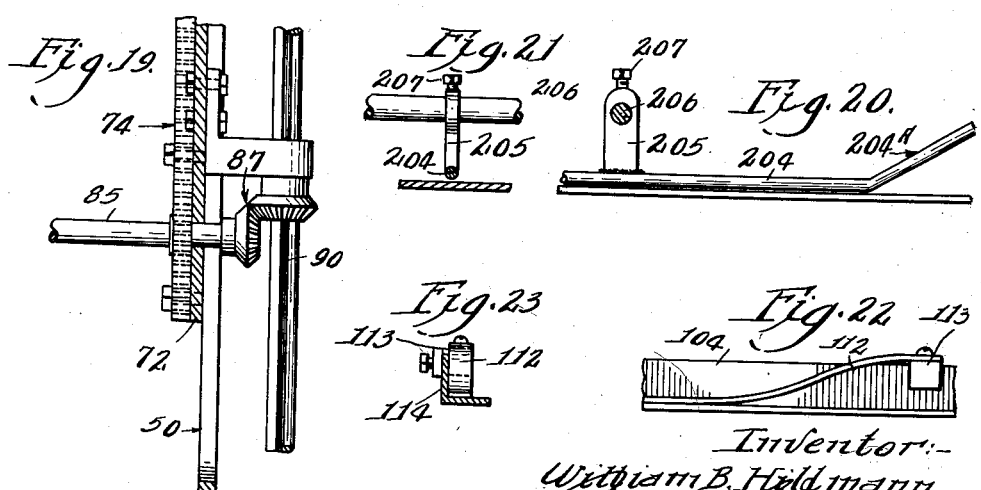
Inventor:-
William B. Hildmann,
By Allard Levington
Attorney.

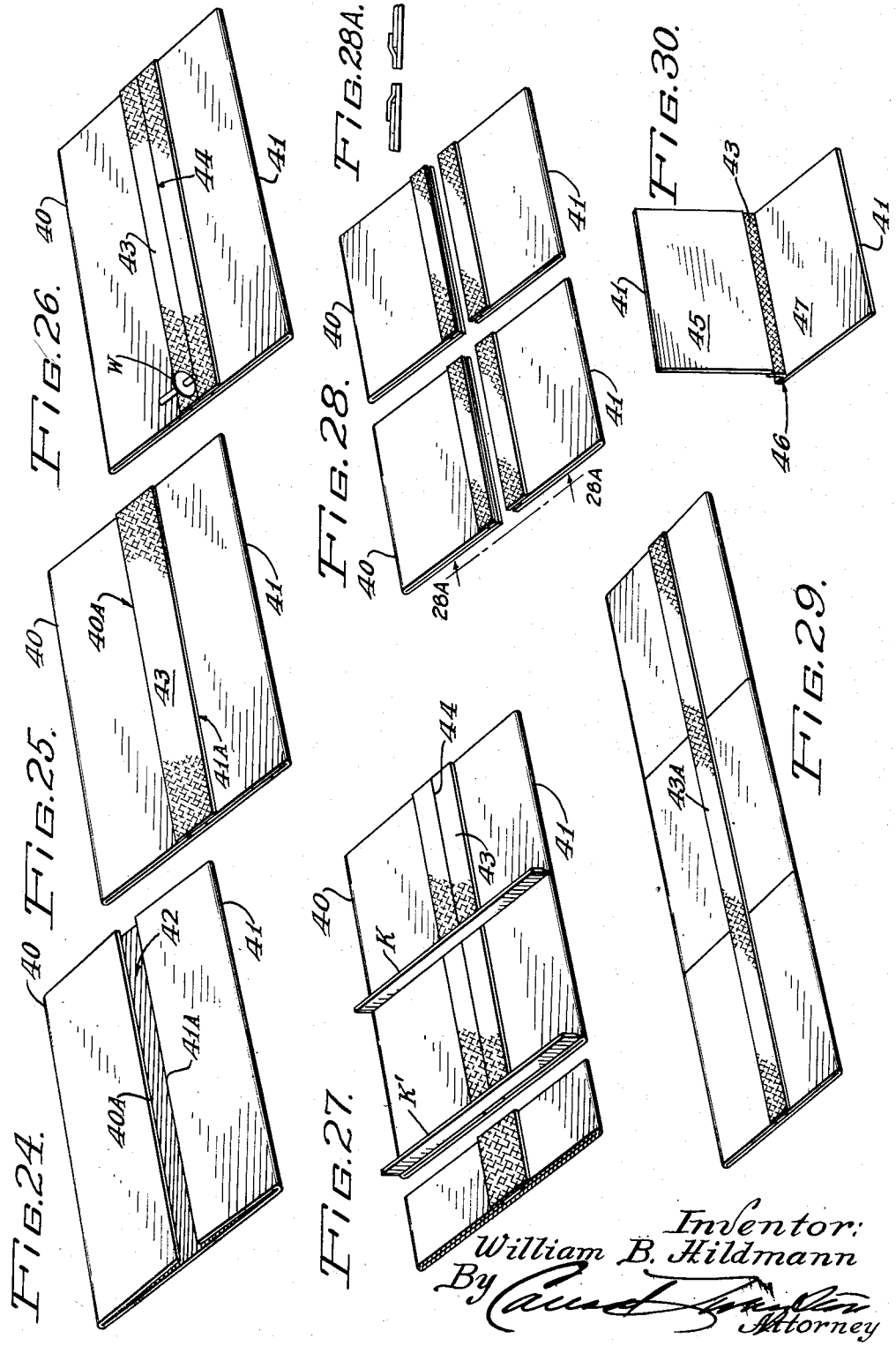

Patented Jan. 12, 1954

2,665,435

UNITED STATES PATENT OFFICE 2,665,435

END SHEET MACHINE

William B. Hildmann, Chicago, Ill., assignor to Brock & Rankin, Inc., Chicago, Ill., a corporation of Illinois Original application August 17, 1946, Serial No. 691,219, now Patent No. 2,524,259, dated October 3, 1950. Divided and this application July 1, 1950, Serial No. 171,663

24 Claims. (Cl. 11—1)

The principal object of this invention is the provision of a machine for making end sheets for use in bookbinding, the machine being adapted to utilize sheet forms of the type disclosed in United States Letters Patent No. 2,524,259, issued October 3, 1950, of which the present application is a division.

In certain types of binding for books, end sheets are placed in the front, and at the rear, of the book between the cover and the adjoining leaf or sheet. Actually, the so-called end sheet consists of two sheets or pages joined by a cloth hinge or analogous tape, and one of these sheets is glued to the inside of the book cover, while the remaining sheet of the pair becomes a fly-sheet or the first page of the book (or the last sheet or page in the case of the end sheet at the rear of the book); the purpose of these end sheets being to provide a finished appearance to these parts of the book, and to afford a connection between the cover members and the signatures of the book, it being understood that the fly leaf or sheet of each end sheet structure is glued or otherwise connected to the binding edge of the book signatures, by reason of which this sheet becomes in appearance and in effect one of the leaves of the book.

In accordance with prior methods for making end sheets, two long sheets of paper stock were hingedly joined by a glued tape, and these joined sheets were cut across the middle so as to form two pairs of sheets joined by a tape, each pair of hingedly joined sheets thus becoming an end sheet assembly, one for the front, and the other for the rear of a book. Thus, in bookbinding, an end sheet is in reality two sheets joined by some form of flexible hinge material, usually bookbinders' cloth.

Machines are known in the bookbinding industry for attaching a tape to a pair of sheets which are to become end sheets, the joined sheets issuing from the machine in a connected series or chain which has to be severed manually between each set of sheets; and this arrangement is slow, subject to mistakes in making the cut, and requires too close attendance and supervision; and since certain types of binding require two sets of end sheets, it is apparent that vast numbers of them must be used in the industry, and that any economy effected in time required for their manufacture, savings on costs by cutting down the number of rejects, or in supervisory or manufacturing attendance, can be of considerable significance in the cost of a run or an edition.

In accordance with the present invention, there is provided a machine for attaching a tape to a form, such as shown in the aforesaid Patent No. 2,524,259, and then cutting the form so as to produce not two, but four sets of end sheets.

The invention further provides apparatus for the practice of part of the method of said patent in the particular of attaching the tape to the stock form and severing the taped form to provide the aforesaid four sets of end sheets.

It is a further and more detailed object of the invention to provide a machine for accurately feeding a prepared end sheet form to a cutting means, and for applying a tape hinge to said form during its travel toward said cutting means, and for severing the forms accurately to produce four complete and disjoined sets of end sheets.

Additional detailed objects are: the provision in a machine of the type characterized above of means for traveling an end sheet form over a predetermined path or bed; means for registering the form at the start of its travel; means for applying and gluing a hinge tape to a certain part of the form before it reaches the end of its travel; means for severing the hinge tapes between successive forms at a certain point along the path of travel; means for severing the hinged form so as to provide a plurality of complete end sheet assemblies; means rendering the several cutting means mentioned above adjustable to operate on forms of different size; means for rendering the above-mentioned traveling means adjustable to accommodate forms of different size.

Still other objects relate to the provision of form and tape cutting mechanism which is adjustable in respect to the position of cut, and to a positive but adjustable power take-off for said cutting mechanism; to the provision of a multiplicity of feed or traveling rollers and guide means shiftable laterally of the direction of travel relative to said rollers, and a unitary adjusting control for simultaneously positioning all of the guide means.

Other objects and aspects of novelty and utility of the invention relate to the details of construction and operation of the apparatus described hereinafter in view of the accompanying drawings in which:

Fig. 1 is a side elevation of the end sheet machine;

Fig. 2 is a top plan view of the traveling bed of the machine;

Fig. 3 is an enlarged side view, partly in section, of the adhesive-applying means for the hinge tape;

Fig. 4 is a top plan view, to enlarged scale, of the hinge tape on the adhesive or gluing roller;

Fig. 5 is a fragmentary plan view of a portion of the glued hinge tape ready for application to the form;

Fig. 7 is a partial side elevation of the end of the machine shown in Fig. 6, and also to enlarged scale;

Fig. 8 is another partial side elevation of that portion of the machine shown in plan in Fig. 6, but viewed from the side opposite that shown in Fig. 7;

Fig. 9 is a fragmentary horizontal section of certain drive mechanism, looking below lines 9—9 of Fig. 7, the parts seen appearing in plan;

Fig. 10 is a vertical fragmentary section taken in the direction of lines 10—10 of Fig. 2, showing one of the shiftable cutter devices in elevation;

Fig. 11 is a vertical sectional fragment of the traveling or feed roller means and unidirectional clutch mechanism;

Fig. 12 is a vertical sectional fragment of the unidirectional clutch mechanism and manual adjusting means, looking in the direction of lines 12—12 of Fig. 11;

Fig. 13 is an inside elevational view of the unidirectional clutch as seen in the direction of lines 13—13 of Fig. 11;

Fig. 14 is a top plan view, to enlarged scale, of the infeed end of the machine;

Fig. 15 is a fragmentary elevational detail, to enlarged scale, of the infeed registering means, looking in the direction of lines 15—15 of Fig. 14;

Fig. 16 is a view similar to that of Fig. 15 but taken in section along lines 16—16 of Fig. 14;

Fig. 17 is a cross sectional vertical detail of the feeding means and bed taken along lines 17—17 of Fig. 14;

Fig. 18 is another vertical cross section similar to that of Fig. 17 but taken at lines 18—18 of Fig. 14;

Fig. 19 is a fragmentary top plan detail of one of the shiftable pinion adjustment units for the traveling bed;

Fig. 20 is a fragmentary side elevational detail of one of the hold-down guide rod supports;

Fig. 21 is an endwise view of the rod support shown in Fig. 20;

Fig. 22 is a fragmentary side elevational view of one of the spring presser fingers in the traveling bed;

Fig. 23 is an endwise view of the device shown in Fig. 22;

Figure 6:
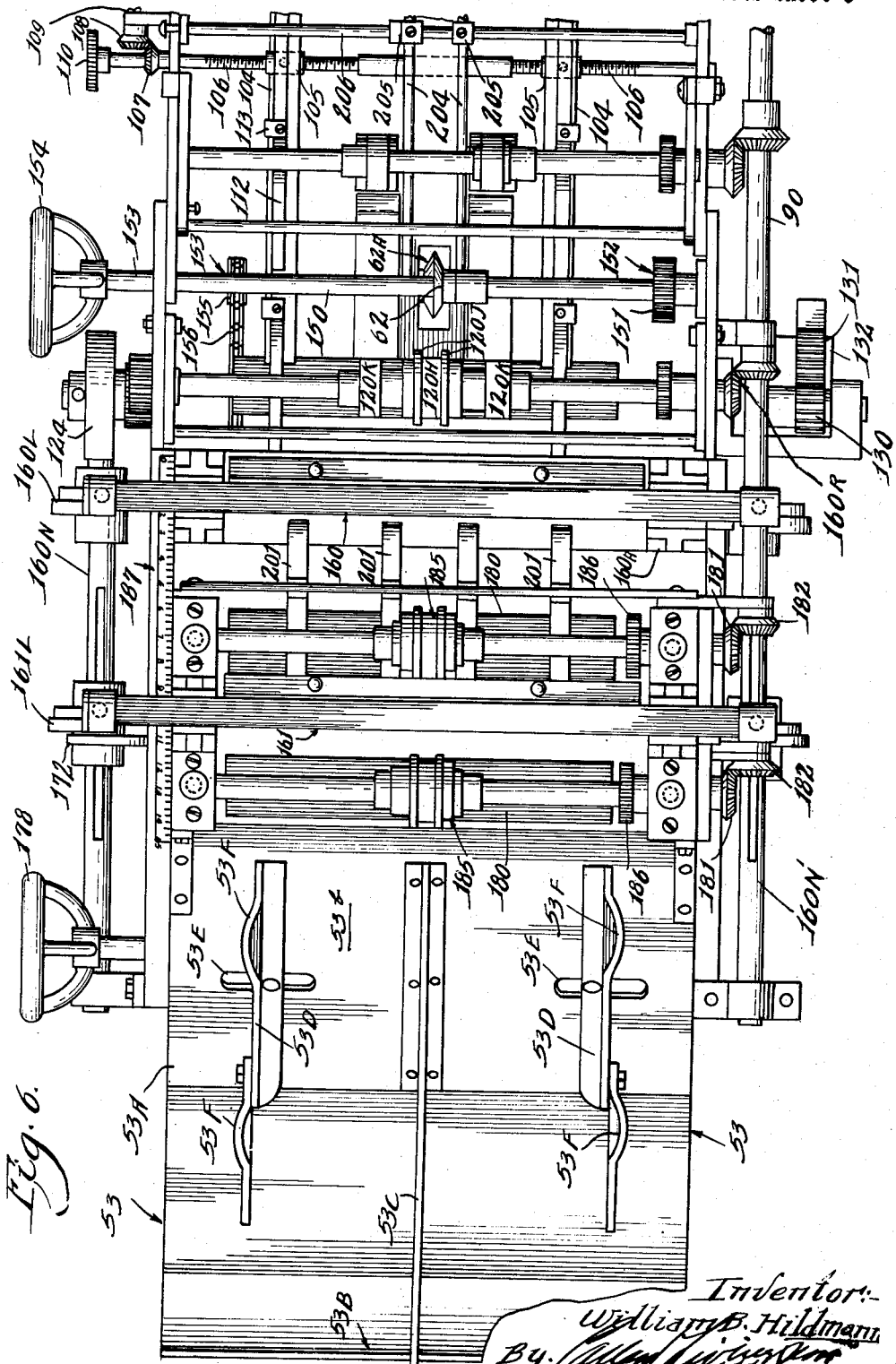
Fig. 6 is a top plan view, to enlarged scale, of the discharge end of the machine, showing particularly certain cutting means and the collecting stackers for the finished end sheets.

Figs. 24, 25, 26, 27, 28, 28A, and 29 illustrate in perspective the steps for preparing end sheet forms and applying the hinge tapes thereto, while Fig. 30 shows in perspective a finished end sheet assembly.

In accordance with the method of Patent No. 2,524,259 as illustrated in Figs. 24 through 30, an end sheet form is prepared by manually or otherwise making folds 40 and 41 in a piece of end sheet stock, so that confronting edge portions 40A and 41A lie in a median portion of the sheet, leaving an exposed portion 42 extending longitudinally of the form for purposes to be described.

The prepared form of Fig. 24 has applied to the said median edge and the exposed portions a hinge cloth or tape 43, the underside of which is glued or otherwise adhered to a substantial area of the paper adjoining edges 40A and 41A, and also to the entirety of the exposed portion 42, resulting in the form, with hinge applied, shown in Fig. 25.

Next, the hinged form is subjected to a slitting process by means of which the form is divided into two halves along the longitudinal slit 44 down the center of the hinge member, this slit being made preferably by a cutting wheel W. Where the forms are used in conjunction with forming apparatus such as described hereinafter, a series of the forms are connected by a continuous tape 43A, as in Fig. 29, so that in the next operation and cutting of the divided form, Fig. 27, as by knife means K, there is an added cutting operation by knife means K' to sever the series to the extent of one form at the same time as that form is itself cut, usually into two equal subsections or subcuts, resulting in the final production of four end sheet assemblies as shown in Fig. 28.

In the usual bookbinding practice, one of these end sheet assemblies would be placed on top of a gathering of book signatures, while another such assembly would be placed at the bottom of said gathering, making up a book form, the edge portions of which would then be trimmed by power cutters, with the result, among others, that the fold portions 40 and 41 of the several end sheet assemblies would be cut, destroying the fold connection, by reason of which the two sheets comprising each end sheet assembly can be opened, like the other pages of the book, in the manner illustrated in Fig. 30.

At this stage of the binding operation, the book covers (not shown) can be applied, and if the end sheet shown in Fig. 30 is the one at the front of a book, then the upper wing 45 would be glued to the inside of the front cover board, while the hinge portion along the binding edge indicated at 46 would be glued or secured to the binding of the leaves of the book signatures, so that the second or inner wing 47 of this same assembly would turn as though it were one of the leaves of the book; and the same would be true of the assembly at the rear of the book but in reverse, that is, wing 47 would be glued to the inside of the rear cover, while wing 45 would be a fly sheet.

GENERAL DESCRIPTION

Mechanism for carrying out certain steps of the end-sheet manufacturing process is shown in a general side view in Fig. 1, wherein a frame 50 provides a traveling or feeding bed indicated generally at 51 and having its infeed end 52 at the righthand side of the sheet, and its discharge end at the left thereof, including a collecting stacker means 53 to receive the sets of end sheets discharged at each feeding operation of the machine.

Prepared sheet forms such as heretofore described, are fed into the machine at the infeed side 52, and after being registered are traveled over the bed 51 relative to a tape or hinge applying means, including an overhead tape supply reel 54, guide roller means 55 directing one side of the tape web 56 over a large gluing roller 57, which picks up glue or adhesive from a small tank 58 on the overhead structure 59, the glued tape being fed reversely over roller means 60 on said structure in such manner that the leading web portion 56A thereof is again reversed to present the glued side downwardly under roller means 61, which feeds the tape in timed relation to the advance or travel of the forms, therebeneath, with the result that the tape is continuously applied to a succession of forms in the manner illustrated in Fig. 29.

As the taped sheet forms continue their travel over the bed 51 by a series of intermittent advancing steps, the slitting and cutting operations, heretofore described, are performed by means including (Fig. 2) a slitter wheel 62, and two reciprocating cutters 160 and 161 adjacent the discharge side of the machine, with the result that for each operating cycle of the machine, a set of four end sheet assemblies, such as shown in Fig. 28, will be discharged into the stacker means 53.

DETAILED DESCRIPTION

Infeed bed and adjustable register

The machine is contrived to accommodate forms of different size, and to this end there is provided a feeding or traveling bed which is adjustable as a width, and which also includes certain adjustable sections and cooperating instrumentalities.

Considering the infeed end of the machine, shown to enlarged scale in Fig. 14, there is a longitudinally shiftable register section consisting of three wide bed plates 70 having support on cross bearers 71, which in turn are carried on parallel, longitudinally slidable side plates 72 supported on the frame structure as illustrated in the sectional view of Figs. 18, 19, there being intervening narrow bed bars 73 running the near length of the bed, which are fixed, between the innermost wide bar and the two adjoining bars 70.

As seen in Fig. 18, the slidable side plates 72 each have a rack bar 74 attached thereto, with which mesh pinions 75 fast on an adjusting cross shaft 76 journaled in the frame and provided with adjusting hand wheel 77. By turning the hand wheel oppositely, the side plates, and hence the bed bars 70 may be shifted longitudinally of the machine to set the registering fingers 78 (Figs. 14 and 17) in accordance with the length of end sheet form to be fed into the machine, a scale 79 calibrated in inches moving with the section relative to an index mark (not seen) to facilitate this adjustment, so that the forms will be started accurately relative to the infeed roller means and tape-applying means for precise movement of the forms relative to the cut-off knives, to be described.

The aforesaid wide bed plates 70 terminate at an infeed presser roller 80 on cross shaft 81 carried at the ends of a pair of lever arms 82 (Figs. 14, 16, 17) rockably attached as at 83 to said shiftable side plates, such that said roller can be rocked toward and away from a driven feed roller 84 on cross shaft 85 also journaled in the shiftable side plate section; and in addition to the centrally located feed roller are flanking companion feed rollers 86 also fast on shaft 85, the latter being rotated intermittently through a pinion 87 (Figs. 14 and 17) meshing with pinion 88 slidably keyed as at 89 on a continuous roller drive shaft 90 on the outside of the frame. Thus, when the slidable register section is moved back and forth, pinions 87 and 88 move with it, the long drive shaft 90 being intermittently rotated by means to be described.

The arrangement is such that the registering fingers 78 reciprocate vertically to be projected and then withdrawn from the path of the incoming sheet forms, serving to stop or register the starting position of such forms when raised, and in order that the forms may be fully positioned against these fingers, the presser roller 80 is contrived to be raised also when the register fingers are raised, this construction being best understood by reference to Figs. 16 and 17, wherein it appears that the fingers 78 are attached to rocker arms 91 pivoting at 92 on the movable section structure, there being links 93 connecting from said rocker arms to cranks 94, as at 95, said cranks being fast on rocker shaft 96, rocked intermittently through a crank connection 97 actuated by a long reciprocating drive rod 98 from the drive mechanism near the discharge end of the machine, to be described.

Presser roller 80 is raised and lowered by means of another crank 99 near each end of shaft 96, and corresponding links 100 connecting as at 101 with respective roller rocker arms 82.

The registering fingers 78 are of spring metal with their upper portions projecting through guide slots in short bed bar sections 102 so that they may flex in reciprocation by the arcuately moving cranks.

A further feature of adjustment of the feeding bed structure includes a pair of angle irons 104 extending longitudinally of the machine from the infeed end almost to the first cut-off knife 160, as in Fig. 2, the upstanding edge portions of these angles providing marginal guides for the paper forms, as will be apparent from Fig. 17; and these angles are arranged to rest on cross bearers, including bearers 71, along the extent of their length, and are further respectively attached to blocks 105 threadably engaging right and lefthand threaded portions 106 (Figs. 6 and 14) of a pair of longitudinally spaced apart cross shafts each having a bevel pinion 107 meshing with a companion pinion 108 on a longitudinally extending adjusting shaft on the outside of the frame, the said cross shaft near the discharge end of the machine, as in Fig. 6, having a knob 110 by which the right and lefthand threaded cross shafts may be simultaneously turned, through cooperation of the longitudinal shaft 109, to cause the pair of angles 104 to shift laterally, that is toward or away from each other, to accommodate the desired width of end sheet form.

Sheet presser fingers 112, such as shown to enlarged scale in Fig. 22, are carried on blocks 113 slidably fitted on the upstanding edge portions of the angle guides 104, as in Figs. 2 and 14, to hold down the forms in movement along the bed.

Intermittent roller feed and drive mechanism

A plurality of intermediate feed rollers 120, of the general construction shown in Fig. 11, are spaced along the traveling bed, the same being preferably of metal with knurling or serrations, and being carried on cross shafts 121 journaled in the main frame structure, the intermediate feed roller nearest the discharge end of the machine being a master roller distinguished in that it is driven through a pinion 122 meshing with gear 123 of a unidirectional ratchet clutch 124 of the known construction shown in Figs. 12 and 13, wherein an outer annular shell 125, carrying pawls 126, is keyed to countershaft 127 to rotate around the companion gear 128 of gear 123, floating on the countershaft, so that when the latter rotates in one direction, e. g. counterclockwise in Fig. 13, gears 128, 123 will move therewith and impart rotative motion to roller 120, but when the countershaft rotates in the opposite direction, the pawls 126 will slip over the teeth of gear 128 and the feed roller 120 will not rotate.

Countershaft 127 is rotated in opposite directions alternately through a pinion 130 meshing (Fig. 11) with a reciprocating rack 131, sliding in yoke 132 (Fig. 1) under urgence of rod connection 133 with slide crank 134 on countershaft 135 which (Fig. 7) is driven through gears 136, 137, 138, 139 and main power shaft 140, driven by motor 141 and belt pulley 142.

Cooperating with the several feed rollers 120 are presser rollers 120A (Figs. 1 and 2) on rocker arms 120B held down by coil springs 120C to limits determined by setting of tappets 120D (Fig. 7), these presser rollers being driven from pinions 120E meshing with pinions 120F on the main roller shafts, as in the case of the master roller of Fig. 11.

Slitting, cut-off and register mechanism

The slitting means includes the beveled cutting wheel 62 of Fig. 2 on cross shaft 150, which, as seen better in Figs. 6 and 7, is driven through pinion 151 meshing with pinion 152 (Fig. 7) on cross shaft 153, which terminates at the side of the machine in a hand adjusting wheel 154, as in Fig. 6; and as in the latter view, shaft 153 is driven through sprocket gear 155, chain 156, sprocket gear 157 (Fig. 7) on countershaft 158. Sprocket chain 156 is tensioned by a rocker idling sprocket 159, Fig. 7.

Since gears 137, 138 on shaft 158 drive with the main power shaft 140, Fig. 7, it is apparent that turning of hand wheel 154 imparts operating motion to the entire machine, as when the motor 141 is turned off, by which means the working parts may be slowly moved into desired positions, relatively, to facilitate adjustments in the width of the feed bed, the relative position of the adjustable registering unit at the infeed end of the machine, starting of the hinge tape feed, etc.

The slitting operation is effected by wheel 62, appropriately beveled to give it a cutting edge, and a companion wheel 62A on said cross shaft 153, Figs. 7 and 8, the end sheet forms passing between these two slitting wheels to effectuate the hinge cut 44 by wheel means W, suggested in Fig. 26.

In order to hold down the now two sections of the end sheet form after slitting, there is provided a special hold-down or presser roller construction of the type shown in Figs. 6 and 11, and consisting of a central roller 120H having two axially spaced circumferential rings 120J, and flanked by additional roller elements 120K, the rings 120J engaging the hinge portions close to the slitting line, and the additional rollers 120K assisting in keeping the course of the severed halves straight.

The aforesaid presser roller means 120H, 120K, cooperates with feed roller means 120, driven as explained in connection with the construction of Fig. 11.

After passing through the slitting means, the severed portions of the end sheet forms advance the full length thereof between open shearing and cut-off means including (Figs. 6 and 7) two vertically reciprocable knives 160 and 161 having the general construction shown in Fig. 10, which depicts the second, and last, of the two knives, 161, the latter differing mainly from the first knife 160 in that the latter is not adjustably movable, while the former is, and there are other differences to be explained hereinafter.

For convenience, the knife structure is described generally in view of Fig. 10, wherein it is seen that the knife unit consists of a lower, stationary blade-holding bar 161A secured in castings 161B on opposite sides of the machine (Fig. 7 particularly) with a lower blade 161C secured to said bar.

The upper portions of said castings 161B are formed to provide vertical slots or yokes, as at 161D (or 160D), Figs. 7 and 10, in which a movable knife bar 161E (or 160E) fits for vertical reciprocation under urgence of crank arms 161F (or 160F) pivoted thereto, as at 161G (or 160G), and normally pulled downwardly by springs 161H, which are largely concealed from view, but which are attached to the lower ends of rods 161X partly seen in Fig. 7, said rods in turn projecting downwardly from the movable knife bar 161E and having said springs attached thereto, said springs in turn being anchored to pins carried by certain yoke arms 172, Fig. 10, to be described.

A difference in the arrangement of the two knife units resides in the connection of springs 160H, Fig. 8, for the first knife bar 160E to the lower ends, respectively, of the two cam rods 160F thereof, these springs being anchored to the main frame.

Returning to the knife unit construction shown in Fig. 10, there is a knife blade 161J secured to the reciprocating bar 161E and shearing with the stationary lower blade 161C.

Reciprocation of the movable blade carriers is effected in timed relation to other operations in the machine by means of cam riders 161K rolling on especially developed cams 161L slidably keyed, as at 161M, on short side shafts 160N, the latter shaft on the lefthand side of the machine being driven through bevel gears 160P, shaft 160Q, and bevel gears 160R, with the shaft 160N' on the righthand side of the machine, as in Fig. 9. Shaft 160Q is driven with the main power take-off means shown in Fig. 7 in particulars explained hereinafter.

The cam drive for the first knife unit 160 illustrated in Fig. 8 differs from that just described for the second unit in that the cams 160L are fixed on shafts 160N and 160N', and do not slide thereon as do the cams 161L, and for this reason the springs 160H may be anchored to the main frame, since the corresponding cut-off or knife unit does not move, as does the second knife unit 161.

The first or inner knife unit 160 is properly a cut-off means in that it severs the leading set of endsheets from the next succeeding form, while the second or terminal knife unit 161 is a multiplying knife since it divides the slit forms into a plurality of endsheet assemblies, cooperably with the slitting functions of slitting wheels 62, 62A; and a notable difference between the second or terminal knife means 161 and the inner or cut-off knife means 160, resides in the fact that unit 161 is adjustably movable longitudinally of the machine.

In Fig. 10 it will be observed that the casting members 161B are carried on a table or plate 170 keyed, as at 171, into the machine framework to slide longitudinally; and depending from this plate are yoke arms 172 secured to the table so as to move therewith; the yoke ends of these arms fit into annular grooves 174 (Fig. 7) formed in the movable cams 161L such that when the table or plate 170 shifts, cams 161L shift with it.

Longitudinal adjustment of the movable knife unit is effected through means shown in Figs. 7 and 10 and including a threaded shaft 175 turned through bevel gears 177 when the hand wheel 178 of Fig. 9 is adjusted, thereby moving plate 170 through the threaded traveler block 176 on the bottom thereof. Such adjustment of the terminal knife unit determines the relative length of the several endsheets issuing from the machine, and apparently when a shorter endsheet form is fed through the machine, the terminal knife unit must be brought closer to the stationary unit if the portions respectively severed thereby are to be equal in length.

Another difference between the two knife units resides in the fact that the movable unit 161 carries with it its own assembly of feeding rollers, including a pair of lower driving rollers 180 (Figs. 6 and 7) driven through bevel gears 181 (Fig. 6) meshing with bevel gears 182 slidably keyed on the long side shaft 90, which is rotated unidirectionally and intermittently in the manner heretofore described.

There is one of the driving feed rollers 180 on each side of the movable knife means 161, and each said roller has a companion upper roller means 185, Figs. 6 and 7, similar to the roller means 120H, 120J, and each driven through pinions 186 meshing with companion pinions (not visible) on the corresponding shafts of rollers 180, as in the case of the construction of Fig. 11. Thus, the movable or adjustable multiplying knife unit includes flanking feed roller means movable therewith. As seen in Fig. 6, there is provided a scale 187, calibrated preferably in inches, moving relatively to index arrow 188, Fig. 8, to facilitate setting of the movable knife unit.

The operative timing of the feeding or advancing operation of roller means 180, 185 is calculated to occur when the knives 160, 161 are open, such that the four complete endsheet assemblies resulting from the cutting or shearing operation thereof will be simultaneously discharged from the machine into the stacking means generally indicated at 53, and including, as best seen in Figs. 1 and 6, a downwardly inclined apron 53A having an upstanding stop plate 53B at its lower end with a centrally located, upstanding partition plate 53C flanked by upstanding wings 53D mounted on the apron for lateral movement by attaching bolts working in slots 53E therein; and the wings have laterally offset sheet guide protrusions 53F thereon. Situated above the apron 53A is a downwardly inclined plate 53G, Fig. 7, having its upper edge situated close to the discharge side of roller means 180, 185 on that side of the terminal knife, so that the severed sheets are initially guided for lodgement against the stop plate 53B in stacks on opposite sides of the partition plate 53C.

As an important part of the operative timing of the machine, the register fingers 78 of Fig. 16 must rise into form-stopping position at a certain instant relative to the opening of initial feed roller means 80, 86, and other operations of the machine, and to this end, the reciprocating rod 98 which actuates the lever mechanism for raising and lowering the register fingers, as heretofore described, is driven from the same cross shaft 160Q employed to actuate the knife units, the means for accomplishing this including a cam 190, Figs. 7 and 9, on said shaft, upon which rides roller 191 on pitman link 192 pivoted on said drive rod 98, as at 193, Fig. 9 there being a pair of flanking springs 194 attached as at 195 to the rod 98 and anchored on upright rods 196 clamped as at 197 on a cross bearer or tie rod in the frame, said spring means serving to urge rod 98 toward the left and maintain the cam roller on the cam.

Shaft 160Q is driven constantly from power gear 136 through intermediate gear 199 and gear 200 on said shaft 160Q; and intermittent reciprocation of the two knife units 160, 161, as well as the register actuating rod 98, occurs in timed relation as the respective cam means 160L and 161L, and 190 are constantly rotated, whereas the intermittent operation of the several feed roller means is effected through the unidirectional clutch means 124 and reciprocating rack means 131 heretofore described, the slitting wheel means 62, 62A rotating constantly.

Throughout its travel over the feeding bed, the endsheet form and severed parts thereof, are held down by means such as the spring presser fingers 112 on adjustable clamp blocks 113, such as shown in Figs. 22 and 23; or by spring fingers 201 adjacent the outfeed end of the machine as in Figs. 6 and 7; and in addition there are provided the pair of longitudinal hold-down rods 204 appearing in Fig. 2, and to the left of Fig. 14 and the right of Fig. 6, these rods being mounted as in the detail showing of Figs. 20 and 21, on hanger brackets 205 adjustably engaging cross rods 206 by means of set screws 207, the lower ends of the brackets being welded onto the rods 204, and the leading infeed ends of the latter rods being upturned as at 204A, Fig. 20.

The same intermittent operation of the several feed rollers above-mentioned characterizes the tape feeding movements of the special tape feed roller means 61 and the cooperating feed roller means 120X, which is driven from the common or long side shaft 90 in the same manner as the master roller means 120 of Fig. 11; and in addition, positive intermittent drive is effected on the gluing wheel 57, Fig. 1, by means of sprocket chain 57A driven from a sprocket gear (not seen) on the feed roller shaft of roller means 120Y, Fig. 1.

The hinge tape portion 56A passes around an idler roller 56B, Fig. 14, before passing beneath roller means 61 and 120X, and there are provided a pair of guide leaf springs 56C on arm 56D carried on fingers 56E which are, in turn, carried on a rod 56F in rocker arms 120B', over which guide springs the tape feeds between the feeding rollers.

In connection with the gluing roller 57 shown in Fig. 3, attention is called to the top plan view of Fig. 4 thereof, and to annular grooves 57A spaced apart axially therein for the purpose of laying the glue in three separate tracks on the tape as indicated at 56X, 56Y, and 56Z, Fig. 5, by reason of which the hinge tape is glued centrally to the endsheet form portion indicated at 42 in Fig. 24, such that when this portion is slit along the line 44 as in Fig. 26, there will be the glued attachment indicated at 46 in Fig. 30 for both slit halves of the form, the two outer glue strips 56X and 56Z becoming attached to the top form leaves as at 40A and 41A in Fig. 25.

*Summary of operation*

The machine is first adjusted to receive the prepared form of Fig. 24 in accordance with the dimensions of the latter, such adjustment being effected by turning the small hand-wheel 110, Fig. 6, to shift the angle guides 104 in accordance with the lateral width of the said form, there being a plurality of crosswise threaded shafts 106 turned by hand-wheel 110 directly and through pinion drive with the side shaft 109.

Next, the hand-wheel 77 (Fig. 14) is turned to shift the infeed registering bed lengthwise of the machine through pinions 75 working in racks 74

(Fig. 18), thereby adjusting the machine in accordance with the length of said prepared form.

Next, the hand-wheel 178 (Figs. 6 and 9) is turned to shift the movable knife units 160, 161 lengthwise of the machine so that the cut-off and multiplying cuts made by these units, respectively, will likewise be in accordance with the length of said form, the shifting of said units being effected through pinion means 177 and the screw shaft 175 of Fig. 9 moving the threaded portion 176 to shift the casting which carries the reciprocating knives 160E, 161E, as in Fig. 7.

With the foregoing principal adjustments, and a correspondingly appropriate adjustment of the stacker wings 53D (Fig. 6), the machine is in readiness for operation, and an operator then feeds the prepared forms shown in Fig. 24 beneath the infeed roller 80 (Fig. 1) which is periodically raised, so that the leading or inward edge of the form stops against the raised registering finger 78 (Fig. 16).

The prepared form consists of a paper sheet having opposite side edges folded inwardly toward each other so that said edges are oppositely disposed in parallelism but spaced apart to leave a median exposed portion 42 as in Fig. 24, this exposed portion being fed into the machine uppermost.

Upon the next intermediate feeding action of the machine the infeed roller 80 will close with its companion roller and the registering finger will descend so that the form may advance between the tape-applying means and the tape web 56A which has its underside coated with an adhesive or glue in three parallel tracks 56X, 56Y, and 56Z, as shown in Fig. 5, the central adhesive track 56Y being superimposed upon the aforesaid median exposed portion 42 of the form and one of each of the two remaining tracks being superimposed upon one of the parallel edges 40A or 41A of the form and an adjoining portion of said median exposed portion, the tape being pressed against the advancing form beneath roller means 61.

The form with tape applied as aforesaid is now advanced step-by-step through the action of intermediate feed rollers 120 along the feeding bed toward the slitting wheels 62, 62A (Fig. 6) by reason of which the taped form is now slit lengthwise, as along the line 44 of Fig. 26, to divide said form into two halves or sections at the middle of the tape, it being observed that said tape is continuously fed as from the reel 54 (Fig. 1), so that the advancing forms are connected in series. After slitting, the two sections continue their advance beneath the cutting units 160, 161, and the reciprocating knife members 160E—160J, 161E—161J, with the forms so positioned relative thereto that upon the timed descent of the reciprocating members 160E, 161E, the leading form (which is now slit into two halves as aforesaid) will be cut off at its tape juncture with the immediate succeeding form, and at the same time the two halves of the leading form portions will be cut in half, as in Fig. 27, to provide the multiple end-sheet forms shown in Fig. 28, and upon the next advancing operation of the machine said multiple forms will be discharged by action of the roller means 185 (Fig. 7) into the stacker means 53 (Figs. 1 and 6, also).

In the foregoing operation all of the feed rollers operate intermittently in synchronism, including the special infeed roller means 80—86, the intermediate roller means generally indicated by references 120, inclusive of the special tape-applying roller means 61—120X, as well as the movable discharge roller units 180—185 associated with the cutoff and multiplier knife means.

The intermittent feed roller action is effectuated through the crank rack means 131—134 (Fig. 1) operating the unidirectional clutch means 124 (Fig. 11) and the master feed roller 120 (Fig. 1), in turn, the remaining intermediate feeding and infeed rollers, mentioned above, are driven from the common side shaft 90 (Fig. 1 or 2), the aforesaid discharge roller means 180—185 having slidable pinion drive 181—182 with this common shaft, and the knife units 160—161 having slidable cam drive connection 160L—161L (Figs. 8 and 9), through shafts 160N, 160Q, and take-off gear 200 (Fig. 7), and intermediate gears to the main drive shaft 140.

I claim:

1. An end sheet machine comprising a bed for traveling folded forms with a medial tape-receiving surface and having an infeed end and a discharge end, means moving forms along said bed from the infeed to the discharge end, means applying a hinge tape to the medial tape surface of the forms during travel between said ends, means medially slitting the applied tape and tape surface, means registering the starting position of forms from said infeed end, and cutting means adjacent the discharge end of the machine and operating automatically upon forms approaching said end to cut the same into a plurality of separate end sheet assemblies.

2. A machine for making end sheets and comprising a bed, means for traveling prepared sheet forms over said bed from a starting position of register thereon to a discharge terminus thereon, said forms moving in a horizontal plane and having fold portions spaced medially thereon, means for applying an adhesive hinge substance along the exposed portions of the forms between said spaced fold portions during traveling movement thereof between the said starting position and terminus, means cutting said form medially along and through the hinge substance thereon, and means cutting the form at an angle to the aforesaid median cut to divide said form into a multiplicity of complete end sheet assemblies of the class described.

3. A machine for making end sheet assemblies and comprising a form bed, means moving forms serially along said bed, means automatically securing a hinge portion medially and longitudinally to each form during movement as aforesaid, means thereafter medially slitting said forms along and through the hinge portions thereof, and means thereafter cutting said forms laterally of the slits therein to produce at least four complete sets of end sheet assemblies from each form after securing and slitting of the hinge portion as aforesaid.

4. An end sheet machine comprising a form-traveling bed and means for moving forms from a starting to a discharge position along said bed, means applying a hinge tape to each form in a predetermined central position thereon, means applying adhesive to the hinge tape before application to the form and in multiple spaced apart tracks thereon whereby said tape is secured to the form along certain spaced areas, means slitting said tape and form longitudinally along a secured area to divide the form into identical longitudinal sections, means cutting said sections laterally of the slit aforesaid to divide said sections into at least four complete end sheet assemblies, and means for collecting said assemblies at the discharge position aforesaid.

5. A machine for making end sheet assemblies and comprising a support for forms, means for moving forms serially along said support, a hinge tape feeding means, means for applying adhesive along predetermined track areas on said hinge tape, means for applying said adhesive portions of the tape onto said forms, means for slitting the tape and forms in the direction of movement of the forms, means for cutting the forms crosswise of the slitting thereof, and drive means actuating said moving means, said tape feeding means, said applying means, said slitting means, and said cutting means in a predetermined synchronism.

6. Apparatus for making end sheets used in bookbinding, said apparatus comprising a form bed, means for moving forms serially along said bed, means for feeding a hinge tape onto said forms, means for applying three parallel adhesive tracks lengthwise of the portion of tape fed onto the forms, means for slitting lengthwise the middle one of said tracks and the tape and form portion thereat after the tape is fed onto the form, and means for cutting the slit form crosswise at a plurality of places into a multiplicity of end sheet forms each of which includes a hinge-tape portion.

7. A machine for making end sheets and comprising roller means for traveling prepared end sheet forms having a medially exposed surface and confronting spaced edges thereon, hinge-applying mechanism connecting the traveling forms in series with a continuous hinge material applied to said surface and edges, and cutting mechanism severing the connected forms from each other, and also severing each form lengthwise in the hinge portion thereof and crosswise of the hinge portion thereof, whereby each said form is cut into at least four complete end sheet assemblies each including a part of one of said forms and a hinge portion, together with drive mechanism actuating the foregoing means and mechanisms in cooperation for the purposes and in the manner set forth.

8. An end sheet machine of the class described and comprising a form traveling bed, roller means acting intermittently to travel forms fed onto said bed from an infeed position toward and relative to certain cutting means thereon, infeed roller means acting intermittently to diverge and close to seize and advance forms fed onto the bed at the infeed position, longitudinally adjustable register means coacting with said infeed roller means to determine the starting position of forms advanced as aforesaid, cutting means disposed remotely from said infeed starting position and acting intermittently to make plural cuts in forms traveled thereto, means for adjusting the position of at least part of said cutting means to predetermine the position of at least some of said cuts relative to the longitudinal dimensions of the form and in correlation to the amount of travel of a form from said infeed position and as determined by said adjustable register means, together with means for hingedly connecting certain portions of each form with certain other portions thereof prior to arrival of the forms into cutting relation with the cutting means, and driving mechanism for actuating the foregoing means, excepting said adjusting means, in cooperation in step in the manner and for the purposes set forth.

9. A machine for making end sheets and comprising a traveling bed onto which prepared forms are fed, said forms each including a sheet having opposite edge portions folded over onto itself to provide two sections of double sheet thickness separated by a median sheet portion of single thickness, means for traveling said forms along said bed in a direction in alignment with said median portion, means for feeding a hinge web onto said forms against and in parallelism with said median portion and with a web portion engaged also with each of said opposite edge portions, means for applying adhesive in tracks to the face of the web engaging said edge portions and a central part of said median portion, means for slitting said web and form along said central part of the median portion in the direction of travel of the form, means thereafter acting to cut said web between forms, and also to effect plural cuts in said forms crosswise of travel, whereby to produce at least four end sheets each including a double sheet thickness of form with edge portions of each thickness joined by hinge webbing.

10. In an end sheet machine of the class described, a form-traveling bed, a plurality of unidirectionally and intermittently acting rollers for traveling forms from an infeed end to a discharge end of said bed, a pair of unidirectionally and intermittently acting infeed rollers shiftably mounted for adjustment at the infeed end of said bed and coacting in feeding operation with said first-mentioned rollers, means for intermittently separating said infeed rollers to receive a form therebetween, a registering finger mounted to shift with said infeed rollers nad moved intermittently into form-stopping position inwardly of the bed from said infeed rollers when the latter are separated, and retracted from the path of forms advanced by said infeed rollers when the latter act in feeding operation, and adjustment means for shifting said infeed rollers and register finger together, and intermittently acting form-cutting means at an end of said bed remote from the infeed end thereof and to which forms are traveled by said first-mentioned roller means into predetermined cutting position by coaction of all of said roller means and said registering finger, and drive mechanism for actuating said roller means, said registering finger, and said cutting means in intermittent and timed cooperation as aforesaid.

11. In an end sheet machine, a form-traveling bed, form-cutting means adjacent one end of said bed, and cutting forms crosswise of their travel, an infeed section at an opposite end of said bed and shiftable in the direction of travel of forms thereover, said infeed section including form-traveling means for moving forms toward following portions of said bed, and register means mounted to move with said infeed section and movable into and out of the path of advance of said forms cooperatively with said traveling means for starting movement of forms by said traveling means in predetermined relation to said following portions, means receiving forms started as aforesaid from said infeed section and traveling the same into a predetermined cutting position relative to said cutting means, and means for traveling cut forms to a discharge position beyond said cutting means.

12. Mechanism as defined in claim 11 and further characterized by the provision of driving means common to said cutting means, the traveling means of said infeed section and said following portions of the bed, and said register means, for actuating the same in timed cooperation substantially as set forth.

13. Mechanism as defined in claim 11 and further characterized in that said cutting means is shiftable in the direction of travel of forms on said bed, whereby the position of cut on said forms is adjustable in determined relation to shiftable adjustment of said infeed section.

14. Mechanism as defined in claim 11 and further characterized in that said cutting means is shiftable in the direction of travel of forms on said bed, and there is additionally provided driving means with shiftable coupling common to said cutting means, the traveling means of said infeed section and of said following portions of the bed, and said register means, for actuating the same in a predetermined synchronism, substantially as set forth.

15. In an end sheet machine, a form feeding bed, driven roller means situated at intervals along said bed for feeding forms from an infeed end toward a discharge end thereon, an infeed section at said infeed end and adjustably movable back and forth in the direction of travel of forms toward said discharge end, means for moving said infeed section as aforesaid to desired positions of adjustment, a common roller-drive shaft at a side of said bed and means drivingly interconnecting said roller means therewith, a main power means for driving said drive shaft unidirectionally, a pair of infeed rollers on said infeed section, at least one of the same having yieldable driving connection with said common drive shaft, and the remaining said infeed roller being movable toward and away from the first-mentioned one of said infeed rollers to permit insertion therebetween of a form and seizure of said form for advance toward the other said roller means, means actuated by said main power means for periodically moving said remaining infeed roller toward and away from said first-mentioned one of the infeed rollers as aforesaid to open said rollers, and form-stopping register means carried by said infeed section and moved periodically by said main power means into position to stop a form at a certain position between said infeed rollers when the latter are open.

16. In an end sheet machine, a form traveling bed, roller means on said bed for moving forms unidirectionally from a certain register position at an infeed end toward a discharge end thereon, an infeed section and infeeding roller and register means thereon and jointly shiftable adjustably of the bed at said infeed end in the direction of travel of forms, said register means including a stop movable into and out of blocking position before incoming forms, a cut-off and multiplying cutter means adjacent the discharge end of said bed and also shiftable adjustably in the direction of travel of forms thereon, and form-traveling roller means movable with said cut-off and multiplying cutter means for traveling of forms relative thereto and toward said discharge end.

17. An end sheet machine including an elongated form-traveling bed, a longitudinally adjustable infeed section at one end of said bed, a longitudinally shiftable cutter section and cutter means thereon near an opposite end of said bed, means for adjustably shifting said infeed and cutter sections, adjustable guide means on said bed, plural form-traveling means on said bed for moving forms from said infeed to said cutter sections, form-slitting means between said cutter section and plural traveling means, form-moving means movable with said cutter section, infeed means movable with said infeed section, and periodically operable to seize and advance forms relative to said plural traveling means, periodically acting register means movable with said infeed section for determining the starting position of forms relative to said infeed means, tape-feeding and attaching means on said bed for attaching a hinge tape to forms prior to travel of the latter into engagement with said slitting means, and a main power drive actuating said cutter means on said cutter section, said slitting means, said tape-feeding and applying means, said traveling means, said infeed means, and said register means in predetermined timed relationship, substantially as set forth, together with shiftable drive means operatively interconnecting said form-moving means on the cutter section with said main power drive.

18. In a sheet handling machine, at least two vertically reciprocable cutters, sheet feeding rollers flanking at least one of said cutters, a stationary support, a shiftable support on said stationary support and carrying said cutters and rollers, a stationary drive shaft on said support for said cutters, shiftable cam means on said drive shaft coacting with driven cam means for said cutters, means movable with said shiftable support for moving said shiftable cam means when the latter support is shifted without disturbing coaction between said shiftable and driven cam means, a relatively stationary drive shaft for said feeding rollers, and means drivingly interconnecting said feeding rollers and last-mentioned drive shaft in all positions of said shiftable support.

19. In a sheet-handling machine, an elongated sheet-traveling bed including an infeed end and outfeed end, a longitudinally shiftable infeed section including sheet-feeding means for advancing sheets toward following sections of said bed, an intermittently positioned infeed sheet-stop register movable for adjustment with said infeed section and positioned and acting for movement in and out of form-blocking positions to determine a predetermined starting position for sheets relative to said feeding means, additional feeding means for receiving sheets from said first feeding means and traveling the same at a constant rate toward said outfeed end, and cutting means adjacent said outfeed end for laterally cutting sheets fed by said additional feeding means, said cutting means also being longitudinally shiftable such that adjustment thereof longitudinally with respect to corresponding adjustment of said infeed section permits laterally subdividing said sheets into sections of desired length.

20. In a sheet-handling machine intermediate sheet-advancing means adapted to travel sheets at a predetermined rate between an infeed station and an outfeed station, a longitudinally shiftable intermittently operable cut-off means in advance of said outfeed station for cutting sheets laterally of their travel, and a longitudinally shiftable infeed with movable sheet-stopping register means and associated infeed roller means for receiving and stopping manually fed sheets and starting the same from stopped position in predetermined relation to said intermediate advancing means for delivery thereby into predetermined relation to said cut-off means, and driving mechanism common to said cut-off means, said intermediate advancing means, said infeed roller means and stopping register means, at least, for actuating the same in a predetermined synchronism.

21. In a machine for making end sheets for books, a bed for traveling folded paper forms from an infeeding end to an outfeed end, a stationary transverse cutter near said outfeed end, a shiftable transverse cutter between said stationary cutter and outfeed end, and shiftable back and forth in the direction of travel of the forms, means for shifting said shiftable cutter, a longitudinal cutter on the opposite side of the stationary cutter from the shiftable cutter, means for applying a hinge material to said forms along the line of longitudinal cutting and in advance of the position of said longitudinal cutter, power means for actuating said cutters at certain times relative to the travel of a form with respect thereto, means for traveling forms in succession from said infeed end toward and past said cutters to said outfeed end, a longitudinally shiftable section at said infeed end of the bed, and including infeeding means with a retractable form stop actuated intermittently to receive hand-fed forms and stop the same at a starting position and thereafter start travel of the forms toward said cutters, intermediate form traveling means on the bed for receiving forms from said infeeding means and forwarding the forms into predetermined critical positions relative to the transverse cutters, at least, for transverse cutting at certain points on the forms depending on the length thereof as measured in the direction of travel, and mechanism cooperating with said power means for actuating said infeeding and stop means in timed relation to actuation of said cutters relative to the travel of said forms whereby the latter will be delivered to said critical positions dependently upon the position of said infeeding and stop means adjusted in relation to the length of said forms in the direction of their travel.

22. In a machine for making end sheets, a longitudinally-extensive form bed and mechanism acting to advance end-sheet forms serially therealong, said forms having length and width and each having three medially contiguous longitudinally-extensive tape-receiving surfaces and being advanced lengthwise along said bed; taping mechanism for applying tape with adhesive to succeeding forms at a certain position along the bed and including means located medially of the advancing forms for guiding said tape lengthwise of the forms onto all of the said contiguous surfaces of each form; cutting mechanism situated along said bed beyond said certain position for cutting through the tape and appertaining form both longitudinally and laterally whereby to divide each taped form into several independent end-sheet assemblies each including at least two sheet portions and a conjoining tape portion; together with drive mechanism coordinately actuating said advancing taping and cutting mechanisms.

23. An end sheet machine including a feed bed and feed mechanism for traveling folded end-sheet forms of the class described one after another therealong; taping mechanism overlying said bed and guiding and feeding an adhesive tape web and pressing the same onto the median region of said forms as the latter travel along said bed with said tape laid lengthwise of the forms in the direction of travel thereof; cutting mechanism including longitudinal and lateral cutters positioned along said bed beyond the point at which the tape is applied as aforesaid and movable in cutting engagement with the succeeding taped forms to cut the latter centrally lengthwise along the length of the applied tape and laterally across the width of the form, and tape, whereby to subdivide said taped forms into at least two end sheet assemblies each including at least two leaves hingedly joined by a sub-divided length of said applied tape; together with drive mechanism actuating said feeding, taping, and cutting mechanisms in synchrony.

24. In a machine for making hinged sheet assemblies from pre-folded forms having opposite wings folded over toward each other to provide longitudinally extensive and parallel edges in closely spaced juxtaposition to expose a narrow median surface area of the sheet flanked by at least two overlying areas of said wings; hinge-attaching and subdividing means including, to wit: feeding mechanism for advancing said forms seriatum along a linear path; means defining a guiding and supporting bed for said advanced forms; a first cutting mechanism positioned for operation to cut through each form laterally of its direction of travel at a first station along said path; taping mechanism including means for supporting and paying out a hinge-tape web with adhesive onto a form at a second station along said path which is located ahead of said first station; means for guiding said web with its length co-directional with the travel of a form into conjunction with all of the exposed median surface areas of a form in said second station; a second cutting mechanism located at a point in between said first and second stations and acting to cut through said taped forms and the appertaining tape lengthwise of the latter and the form to subdivide the latter into several independent end-sheet assemblies each including at least two fold portions of the form joined by a portion of the severed tape web; power means for actuating said advancing and cutting mechanisms, and mechanism for timing the actuation of said first cutting mechanism in predetermined relation to the advancing action of said four advancing mechanisms.

WILLIAM B. HILDMANN.

References Cited in the file of this patent

UNITED STATES PATENTS

| Number | Name | Date |
|---|---|---|
| 782,750 | Hoffstedt | Feb. 14, 1905 |
| 861,605 | Ovens | July 30, 1907 |
| 1,863,165 | Persons | June 14, 1932 |
| 2,216,629 | Sabel | Oct. 1, 1940 |
| 2,347,254 | Cox | Apr. 25, 1944 |
| 2,524,259 | Hildmann | Oct. 3, 1950 |

FOREIGN PATENTS

| Number | Country | Date |
|---|---|---|
| 23,091 | Great Britain | Nov. 10, 1905 |